(12) United States Patent
Nowaczyk

(10) Patent No.: US 11,091,283 B2
(45) Date of Patent: Aug. 17, 2021

(54) APPARATUS AND METHOD FOR FLUSHING A RESIDUAL GAS FROM A FLOW OF GRANULAR PRODUCT

(71) Applicant: David Nowaczyk, Naperville, IL (US)

(72) Inventor: David Nowaczyk, Naperville, IL (US)

( * ) Notice: Subject to any disclaimer, the term of this patent is extended or adjusted under 35 U.S.C. 154(b) by 0 days.

(21) Appl. No.: 16/400,033

(22) Filed: Apr. 30, 2019

(65) Prior Publication Data

US 2021/0031957 A1 Feb. 4, 2021

Related U.S. Application Data

(60) Provisional application No. 62/665,035, filed on May 1, 2018.

(51) Int. Cl.
| | |
|---|---|
| *B65B 31/04* | (2006.01) |
| *B65B 1/04* | (2006.01) |
| *B65B 31/06* | (2006.01) |
| *B65B 39/04* | (2006.01) |
| *B65B 55/24* | (2006.01) |
| *B65B 37/02* | (2006.01) |
| *B65B 31/00* | (2006.01) |
| *B29B 9/16* | (2006.01) |

(52) U.S. Cl.
CPC ............ *B65B 31/04* (2013.01); *B65B 1/04* (2013.01); *B65B 31/00* (2013.01); *B65B 31/06* (2013.01); *B65B 37/02* (2013.01); *B65B 39/04* (2013.01); *B65B 55/24* (2013.01); *B29B 2009/168* (2013.01)

(58) Field of Classification Search
CPC ......... B65B 31/04; B65B 31/00; B65B 37/02; B65B 1/06; B65B 39/04; B65B 55/24; B29B 2009/168
See application file for complete search history.

(56) References Cited

U.S. PATENT DOCUMENTS

| | | | |
|---|---|---|---|
| 1,706,708 A | 3/1929 | Robb | |
| 3,713,225 A | 1/1973 | Mark | |
| 3,738,828 A * | 6/1973 | Inoue | B22F 1/0081 419/30 |
| 4,056,368 A * | 11/1977 | Rozmus | B03C 7/02 75/343 |
| 4,078,356 A * | 3/1978 | Gallo | B65B 9/06 426/410 |
| 4,254,616 A | 3/1981 | Siminski et al. | |
| 4,258,476 A | 3/1981 | Caughey | |
| 4,388,088 A * | 6/1983 | Rozmus, Jr. | B22F 1/0081 134/1 |
| 4,406,671 A * | 9/1983 | Rozmus | B22F 1/0081 134/21 |
| 5,653,181 A | 8/1997 | Yang et al. | |
| 10,934,036 B2 * | 3/2021 | Nowaczyk | F28F 9/0221 |
| 10,954,013 B2 * | 3/2021 | Nowaczyk | B65B 31/041 |

(Continued)

*Primary Examiner* — Nicolas A Arnett
(74) *Attorney, Agent, or Firm* — David, A. Gottardo, Attorney at Law

(57) ABSTRACT

This invention relates generally to the packaging and preservation of granular products. More specifically, the invention relates to an apparatus and method for flushing undesirable residual gases from a flow of granular product during a packaging of the product, the displacement of the undesirable gases from the product preserving the product's freshness.

18 Claims, 8 Drawing Sheets

(56) References Cited

U.S. PATENT DOCUMENTS

2014/0123599 A1* 5/2014 Gustafsson ........... B65B 31/021
  53/405
2014/0238536 A1* 8/2014 Kumakura ................ B65B 1/12
  141/67

* cited by examiner

APPARATUS AND METHOD FOR FLUSHING A RESIDUAL GAS FROM A FLOW OF GRANULAR PRODUCT

CROSS REFERENCE TO RELATED APPLICATIONS

This application claims priority to U.S. Provisional Patent Application Ser. No. 62/665,035 having a filing date of May 1, 2018.

TECHNICAL FIELD OF THE INVENTION

This invention relates generally to the packaging and preservation of granular products. More specifically, the invention relates to an apparatus and method for flushing undesirable residual gases from a flow of granular product during a packaging of the product, the displacement of the undesirable gases from the product preserving the product's freshness.

BACKGROUND OF THE INVENTION

Various food products are packaged within containers such that the freshness of the product is controlled and maintained via a minimization of the product's exposure to undesirable, atmospheric gases. This is because undesirable, atmospheric gases, such as residual oxygen, typically do not inhibit the growth of mold or bacteria within the product, or inhibit the product's oxidation. For example, certain granular food products, such as ground coffee, are packaged and sealed within cans or similar containers. During the packaging process for such granular products, the ground coffee or similar product is deposited into the container via a chute or similar device.

However, prior to entering the chute for deposit into the container, the granular product is temporarily stored in a hopper or similar container where it may be exposed to and possibly permeated by the aforementioned undesirable, atmospheric gases. Because it is undesirable to allow these entrapped gases to remain within the granular product during packaging operations, where it may become trapped within with the product within the packaging container, the gases must be removed from the granular product prior to depositing the product into the container. Such removal generally occurs by displacing the undesirable gases from the product with a more desirable flushing gas. Common flushing gases comprise carbon dioxide, for the inhibition of mold or bacterial growth, or nitrogen, for the inhibition of oxidation.

Although prior art systems exist for displacing undesirable gases from within a packaging container with a flushing gas both prior to and after the product is placed therein, such systems nonetheless allow undesirable gases, that may be entrapped within the product, to remain therein. Of course, allowing entrapped gases to remain within the product after it is deposited into the container is undesirable because the container will eventually be sealed, thus allowing the gases to prematurely degrade the product.

Thus, what is needed is a system that flushes entrapped undesirable gases from a granular product prior to or during a depositing of the product into a container. The system should preferably flush the gases from a flow of the granular product such that the desirable flushing gas becomes entrained within the product during a depositing of the product into the container. The present invention meets these needs and provides numerous other advantages over the prior art.

SUMMARY OF THE INVENTION

This invention relates generally to the packaging and preservation of granular products having a granularity ranging from fine particles size (i.e., flours and similar powdered products) to coarse particle size (i.e., nuts, dog food and similar lumped or chunked products). More specifically, the invention relates to a chute for flushing undesirable residual gases, such as degrading, residual oxygen ($RO_2$) from a flow of granular product through the chute during a packaging of the product, the displacement of the undesirable gases from the product preserving the product's freshness.

The chute preferably comprises an upright, open-ended duct defining a through interior for receiving the flow of granular product there-though. The granular product flowing into the duct is typically entrained with the undesirable residual gases, namely, residual oxygen. At least one gas-depositing member is operably associated with the duct for depositing a flushing gas into the flow of granular product and flushing the residual gases there-from. At least one gas-receiving member is operably associated with the duct for receiving at least the residual gases displaced from the flow of granular product. The granular product flowing from the duct is now preferably entrained primarily with the desirable and freshness-preserving flushing gas.

The at least one gas-depositing member s in fluid communication with and receives the flushing gas from a flushing gas source, preferably comprising a pressurized gas supply tank for holding a pre-selected flushing gas. However, it is understood that the gas source may comprise a compressor, pump, generator or other source understood in the art as providing a pressurized gas. The flushing gas comprises any gas or blend of gases understood in the art as exhibiting properties desirable for preserving or maintaining the freshness of the granular product.

It is understood that the at least one receiving member receiving at least the residual gases displaced from the granular product by the flushing gases may also receive a given percentage of the flushing gases mixed with the displaced residual gases. Depending upon the percentage of flushing gases present, the gases received by the receiving member may be recycled for further use within the underlying packaging process.

In a first embodiment of the invention, an inlet and the at least one gas-depositing member are defined in a wall of the duct, with the gas-depositing member preferably defining a plurality of through slits directed into the duct's interior. The slits prevent any product from backing up into the at least one gas-depositing member from the interior of the chute. In other embodiments, a screen may be utilized in place of or in addition to the slits, especially when the product comprises a fine powder. A hollow depositing chamber is preferably defined within the depositing member between the inlet and the through slits. To facilitate a flow of the flushing gas into the duct, the interior, through slits, depositing chamber and inlet are in fluid communication with one another, with the inlet also in fluid communication with the flushing gas source.

An outlet and the at least one gas-receiving member are also defined in the wall of the duct, with the at least one gas-receiving member defining a gas-receiving louver directed into the duct's interior. The louver prevents any product from travelling into the gas-receiving member from the interior of the chute. In other embodiments, a screen may be utilized in place of or in addition to the louver, again especially when the product comprises a fine powder. A hollow receiving chamber is preferably defined within the at least one receiving member between the outlet and the louver. To facilitate a flow of at least the residual gases from the duct, the interior, receiving louver, receiving chamber and outlet are in fluid communication with one another.

In a second embodiment of the invention, the inlet is defined in a wall of the duct while the at least one gas-depositing member bifurcates the duck's interior into two interior sections. The at least one gas-depositing member defines a hollow depositing chamber and a pair of outwardly directed gas-depositing sides directed into each interior section while each gas-depositing side preferably defines the plurality of through slits. In other embodiments, a screen may be utilized in place of or in addition to the slits. To facilitate a flow of the flushing gas into the duct, the inlet, depositing member's hollow chamber, through slits of respective depositing sides and respective interior sections are in fluid communication with one another, with the inlet also in fluid communication with the flushing gas source.

An outlet is defined in the wall of the duct within each interior section. The at least one gas-receiving member defines a pair of inwardly directed gas-receiving louvers with each louver respectively directed into each interior section. In other embodiments, a screen may be utilized in place of or in addition to the louvers. A hollow receiving chamber is preferably defined within the at least one receiving member between the respective outlets and louvers. To facilitate a flow of at least the residual gases from the duct, the outlets, receiving chambers, receiving louvers and interior sections are in respective fluid communication with one another.

In a third embodiment of the invention, the inlets are defined in watt of the duct for three respective gas-depositing members. Two gas-depositing members are respectively defined in wall white the third gas-depositing member divides the duct's interior into two interior sections. Respective outlets are defined in the wall of the duct for two respective gas-receiving members. Gas-receiving members each respectively divide interior sections into respective subsections.

Gas-depositing members define respective hollow depositing chambers while gas-receiving member defines respective hollow receiving chambers. The third gas-depositing member further defines a pair of outwardly directed gas-depositing sides while the remaining two depositing members define inwardly directed sides. The sides each preferably define the plurality of through slits. In other embodiments, a screen may be utilized in place of or in addition to the slits. The gas-receiving members each respectively define a pair of inwardly directed gas-receiving louvers. In other embodiments, a screen may be utilized in place of or in addition to the louvers.

To facilitate a flow of the flushing gas into the duct, the inlets, depositing member's hollow chambers, and through slits of respective depositing sides and respective interior sub-sections are in fluid communication with one another, with the inlets also in fluid communication with the flushing gas source. To facilitate a flow of at least the residual gases from the duct, the outlets, receiving chambers, receiving louvers and respective interior sub-sections are in respective fluid communication with one another.

In a fourth embodiment of the invention, the at least one gas-depositing member is preferably coaxial with the duct and the inlet defines a gas-depositing outer periphery. The outer periphery preferably defines a plurality of through slits directed into the duct's interior. In other embodiments, a screen may be utilized in place of or in addition to the slits. A hollow depositing chamber is preferably defined within the depositing member between the inlet and the through slits of the outer periphery. To facilitate a flow of the flushing gas into the duct, the interior, through slits, depositing chamber and inlet are in fluid communication with one another, with the inlet also in fluid communication with the flushing gas source.

An outlet and the at least one gas-receiving member are also defined in the wall of the duct, with the least one gas-receiving member defining a gas-receiving inner periphery of the duct directed into the duct's interior. The inner periphery preferably defines a peripheral gas-receiving louver directed into the duct's interior. In other embodiments, a screen may be utilized in place of or in addition to the louver. A hollow receiving chamber is preferably defined within the at least one receiving member between the outlet and the peripheral louver. To facilitate a flow of at least the residual gases from the duct, the interior, peripheral receiving louver, receiving chamber and outlet are in fluid communication with one another.

DESCRIPTION OF THE EMBODIMENTS

This invention relates generally to the packaging and preservation of granular products having a granularity ranging from fine particles size (i.e., flours and similar powdered products) to coarse particle size (i.e., nuts, dry dog food and similar lumped or chunked products). More specifically, the invention relates to a chute for flushing undesirable residual gases, such as degrading, residual oxygen ($RO_2$) from a flow of granular product through the chute during a packaging of the product, the displacement of the undesirable gases from the product preserving the product's freshness.

Figure 1:
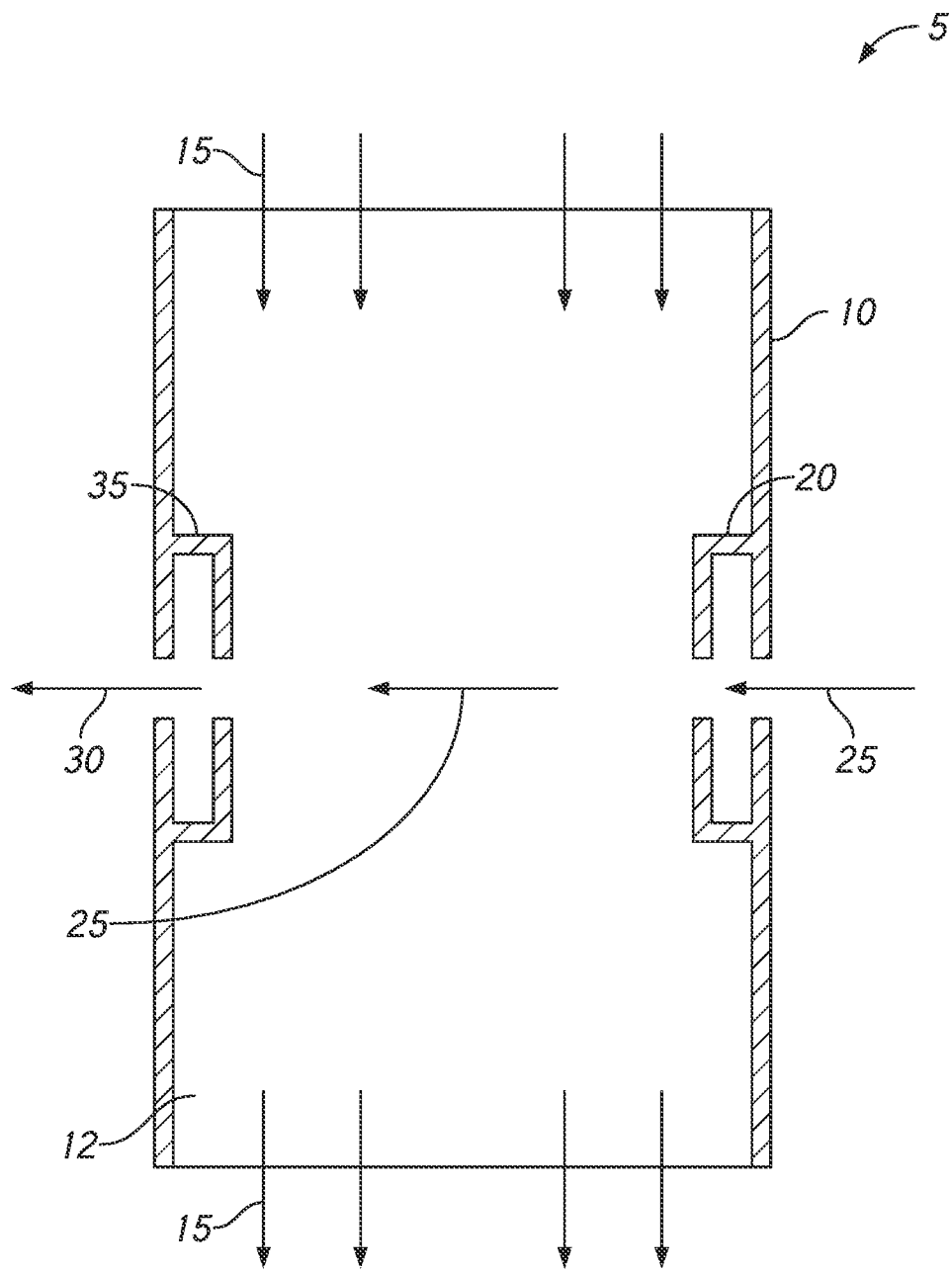
FIG. 1 is schematic diagram illustrating the basic components of the invention.

Referring to the schematic diagram of FIG. 1, the chute 5 preferably comprises an upright, open-ended duct 10 defining a through interior 12 for receiving the flow of granular product 15 there-though. Duct 10 may be round, square, rectangular or any other shape as well. The granular product 15 flowing into the duct 10 is typically entrained with the undesirable residual gases 30, namely, residual oxygen. The granular product 15 may comprise any human or animal food product having a fine or coarse granular form, to include, without limitation, flours, nuts, beans, animal feeds and foods, spices, beverage and food powders, etc. At least one gas-depositing member 20 is operably associated with the duct 10 for depositing a flushing gas 25 into the flow of granular product 15 and flushing the residual gases 30 there-from. At least one gas-receiving member 35 is operably associated with the duct 10 for receiving at least the residual gases 30 displaced from the flow of granular product 15. The granular product 15 flowing from the duct 10 is now preferably entrained primarily with the desirable and freshness-preserving flushing gas 25.

To achieve this entertainment, one embodiment of the invention utilizes a flushing gas to product ratio of about six standard cubic feet per minute (6 SCFM) per one hundred pounds-mass (100 lbm). However, it is understood that other ratios maybe utilized as well, depending upon the nature of the underlying product and the desired end result.

The duct 10, at least one gas-depositing member 20 and at least one gas-receiving member 35 are preferably comprised of polished, stainless steel, aluminum or similar non-corrosive metals and/or alloys. However, it is understood that these components may be comprised of plastics and similar materials as well.

The at least one gas-depositing member 20 is in fluid communication with and receives the flushing gas 25 from a flushing gas source (not shown), preferably comprising a pressurized gas supply tank for holding a pre-selected flushing gas 25. However, it is understood that the gas source may comprise a compressor, pump, generator or other source understood in the art as providing a pressurized gas. The flushing gas 25 comprises any gas or blend of gases understood in the art as exhibiting properties desirable for preserving or maintaining the freshness of the granular product 15.

Thus, in one embodiment, the flushing gas 25 comprises carbon dioxide ($CO_2$) when it is desirable to prevent or inhibit the growth of microorganisms, such as certain molds and aerobic bacteria within the packaged product. In another embodiment, the flushing gas 25 comprises nitrogen ($N_2$) due to its inert qualities and its ability to prevent or inhibit an oxidation of the product. However, it is understood that yet other embodiments may utilize various combinations of these and/or other gases as well.

Referring again to FIG. 1, it is understood that the receiving member 35 receiving at least the residual gases 30 displaced from the granular product 15 by the flushing gases 25 may also receive a given percentage of the flushing gases mixed with the displaced residual gases. Depending upon the percentage of flushing gases present, the gases received by the receiving member 30 may be recycled for further use within the underlying packaging process. For example, the gases received by the receiving member may be in fluid communication with and directed to a product storage area (not shown) located upstream of the chute 5 such that the granular product 15 is stored in a modified atmospheric environment to preserve its freshness.

Figure 2A:
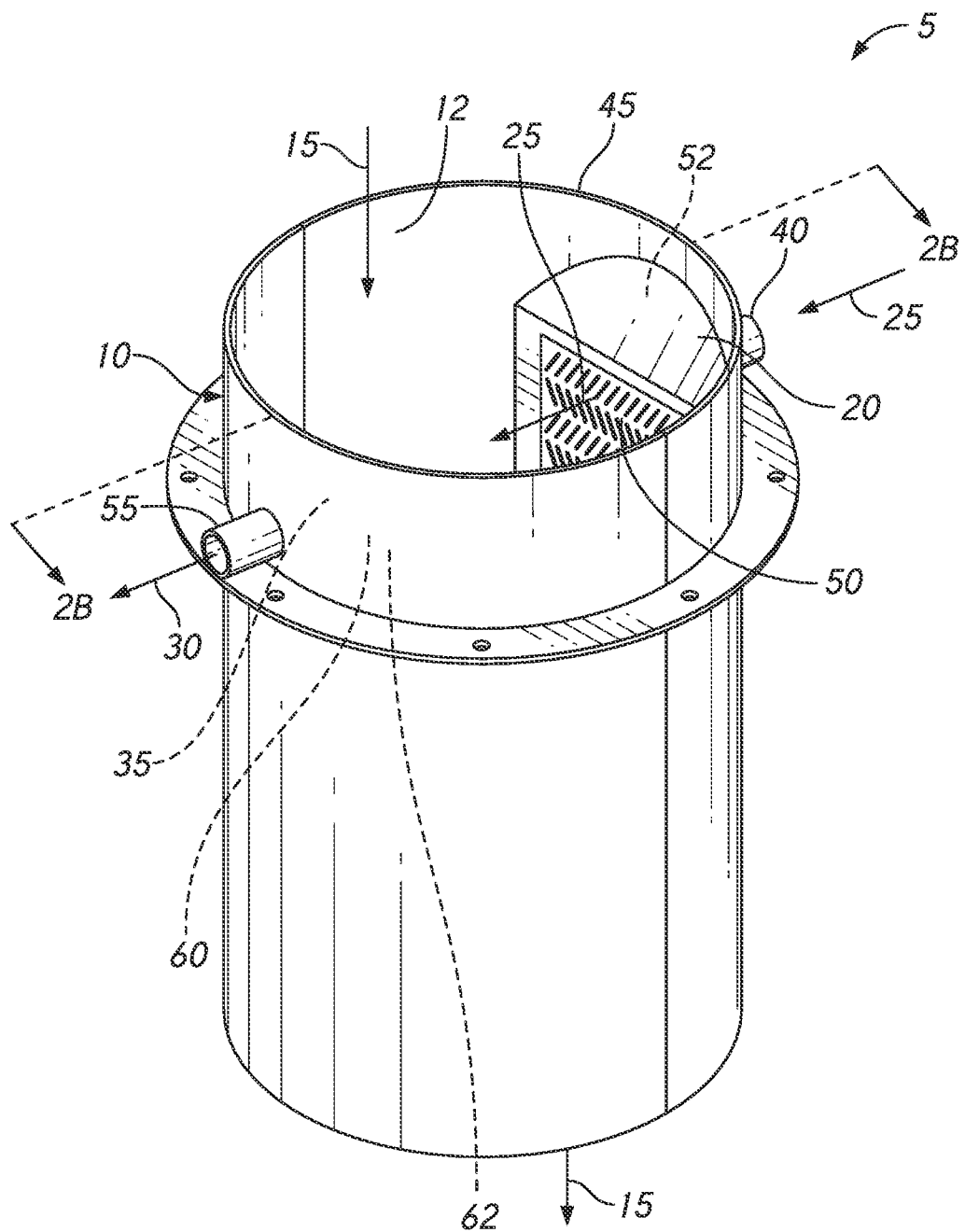
FIG. 2A is a perspective view of a first embodiment of the chute of the invention illustrated in FIG. 1.
Figure 2B:
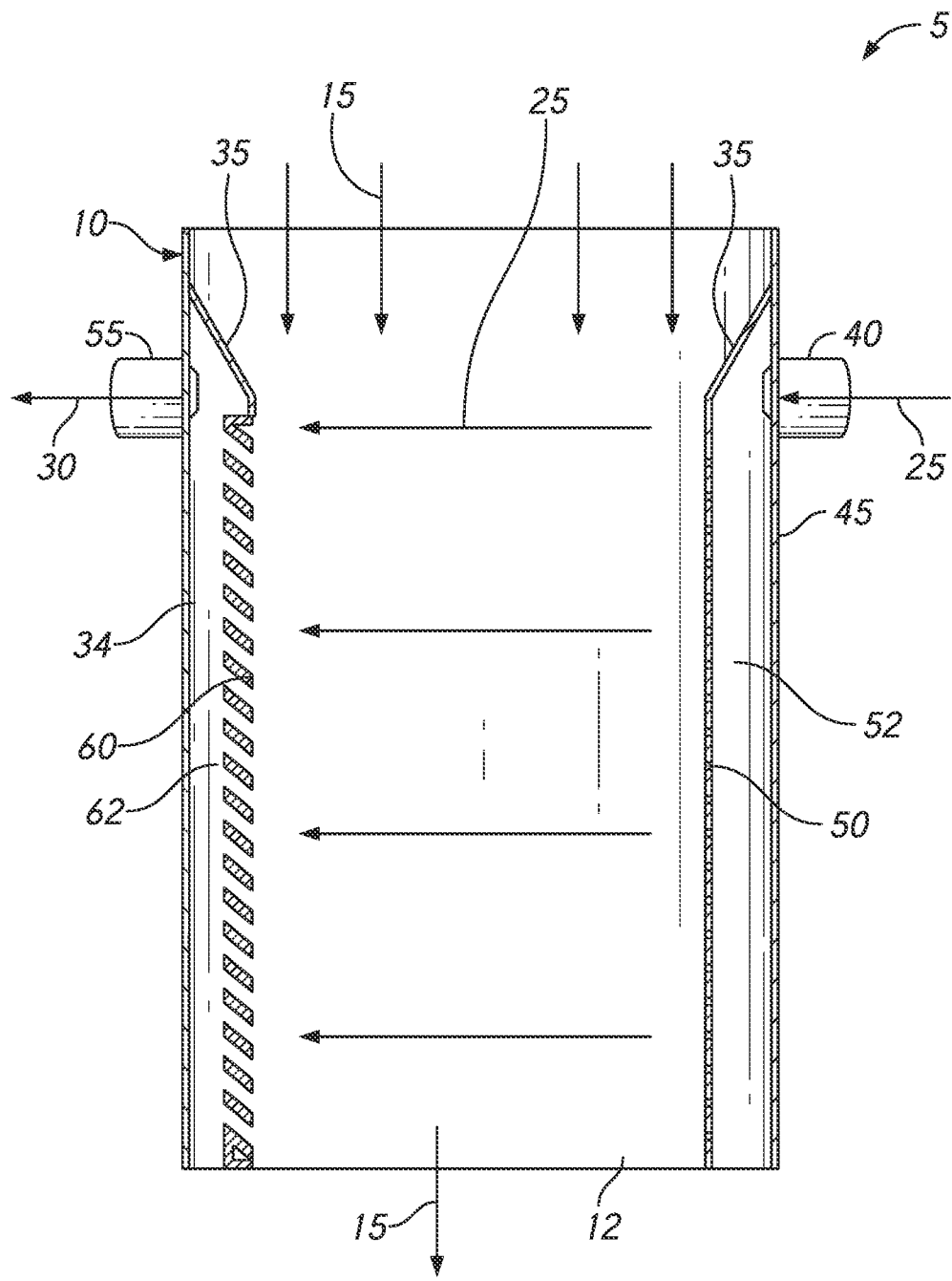
FIG. 2B is a sectional view of the first embodiment of the chute of the invention illustrated in FIG. 2A.

In a first embodiment of the invention illustrated in FIGS. 2A and 2B, an inlet 40 and the at least one at least one gas-depositing member 20 are defined in a wall 45 of the duct 10, the gas-depositing member defining a plurality of through slits 50 directed into the duct's interior 12. Although the duct 10 is round, it is understood that duct may be square, rectangular or any other shape as well. The slits 50 prevent any product 15 from backing up into the at least one gas-depositing member 20 from the interior 12 of the chute 5. In other embodiments, a screen (not shown) may be utilized in place of, or in addition to the slits 50, especially when the product 15 comprises a fine powder. A hollow depositing chamber 52 is preferably defined within the depositing member 20 between the inlet 40 and the through slits 50. To facilitate a flow of the flushing gas 25 into the duct 10, the interior 12, through slits 50, depositing chamber 52 and inlet 40 are in fluid communication with one another, with the inlet also in fluid communication with the flushing gas source (not shown).

Referring again to FIGS. 2A and 2B, an outlet 55 and the at least one gas-receiving member 35 are also defined in the wall 45 of the duct 10, with the at least one gas-receiving member 35 defining a gas-receiving louver 60 directed into the duct's interior 12. The to louver 60 prevents any product 15 from travelling into the gas-receiving member 35 from the interior 12 of the chute 5. In other embodiments, a screen (not shown) may be utilized in place of or in addition to the louver 60, again especially when the product 15 comprises a fine powder. A hollow receiving chamber 62 is preferably defined within the at least one receiving member 35 between the outlet 55 and the louver 60. To facilitate a flow of at least the residual gases 30 from the duct 10, the interior 12, receiving louver 50, receiving chamber 62 and outlet 55 are in fluid communication with one another.

Figure 3:
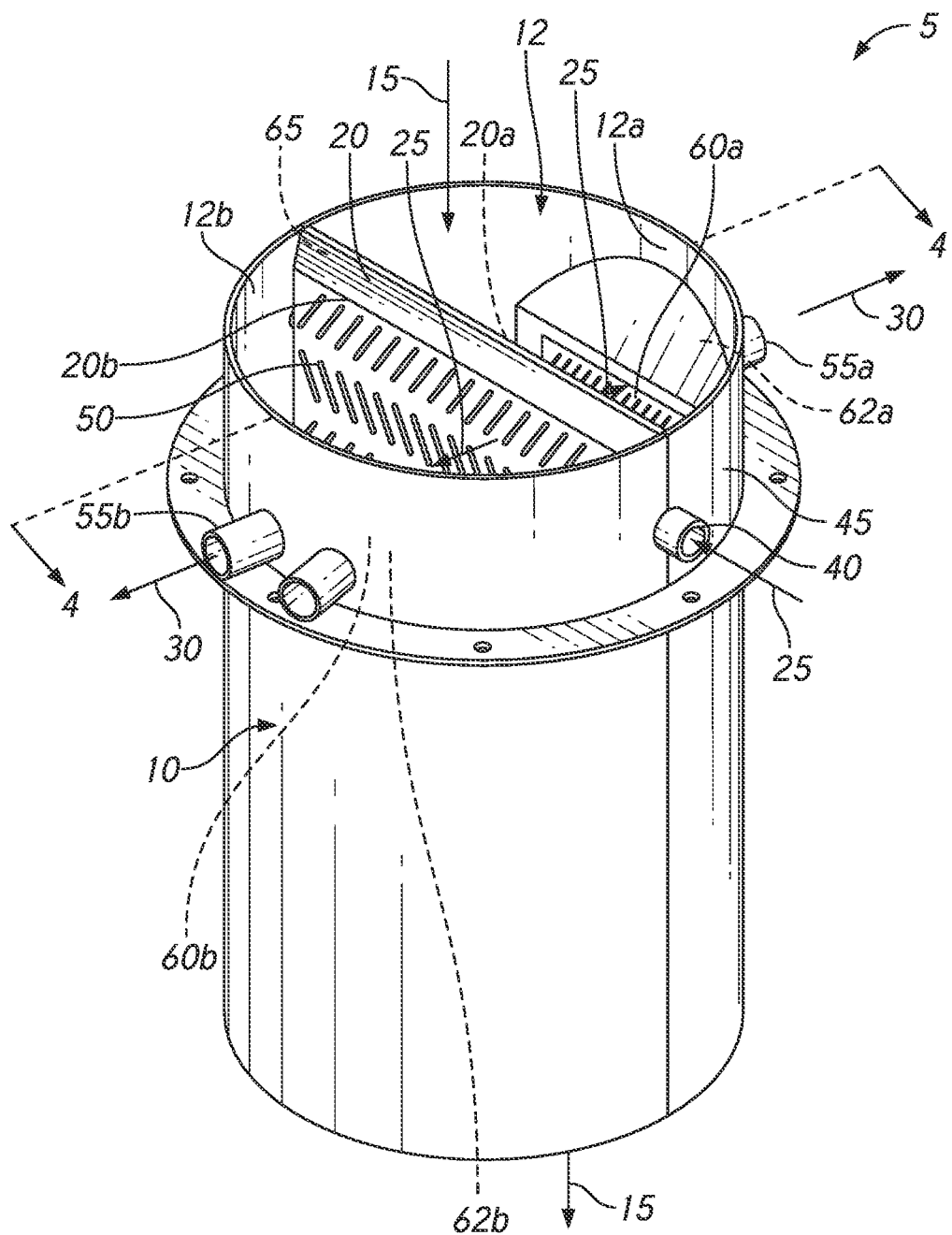
FIG. 3 is a perspective view of a second embodiment of the chute of the invention illustrated in FIG. 1.
Figure 4:
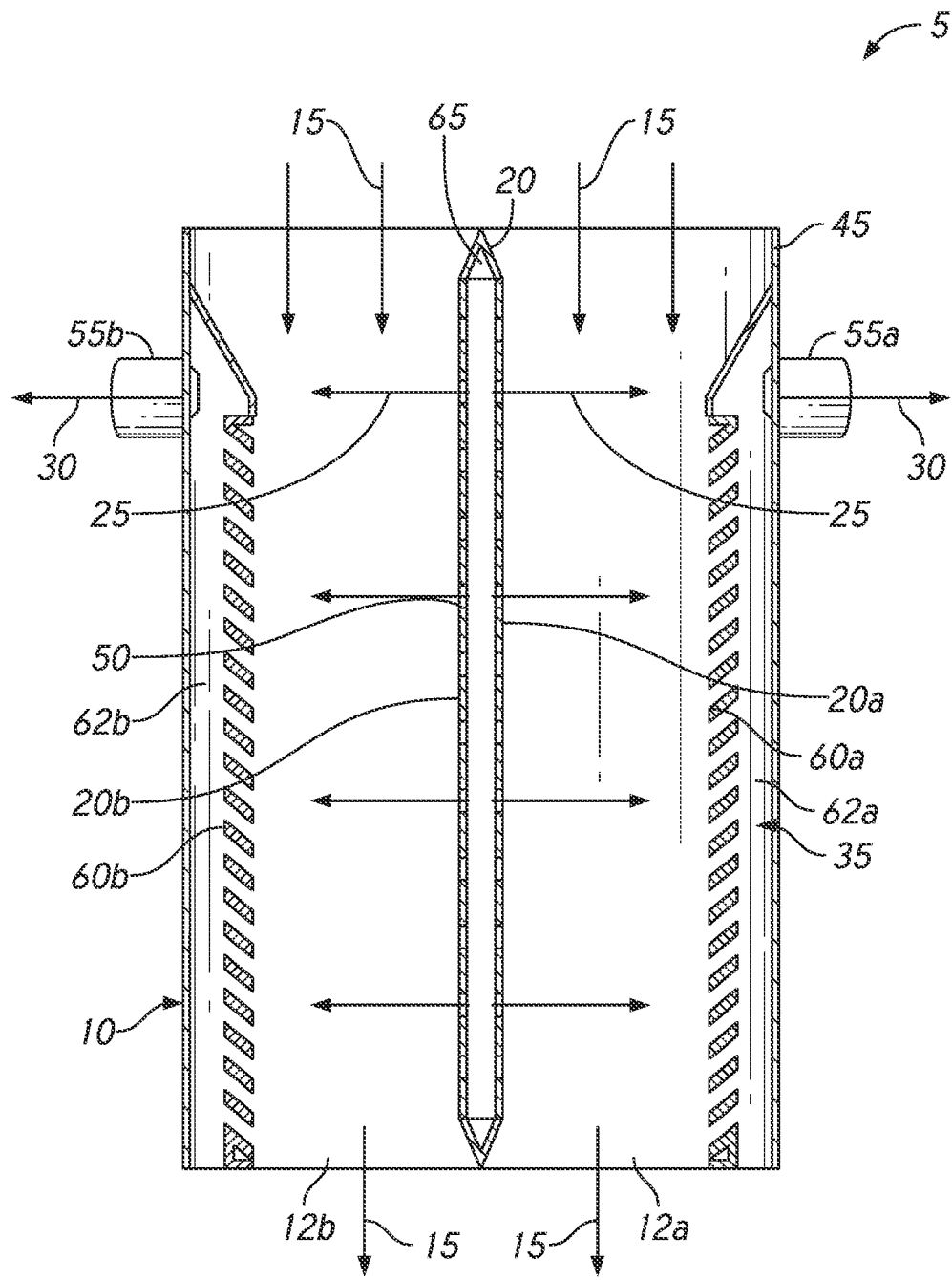
FIG. 4 is a sectional view of the chute illustrated in FIG. 3.

In a second embodiment of the invention illustrated in FIGS. 3 and 4, the inlet 40 is defined in a wall 45 of the duct 10 while the at least one gas-depositing member 20 bifurcates the duct's interior 12 into two interior sections, 12a and 12b. Although duct 10 is round, it is understood that the duct may be square, rectangular or any other shape as well. The at least one gas-depositing member 20 defines a hollow depositing chamber 65 and a pair of outwardly directed gas-depositing sides 20a and 20b respectively directed into each interior section 12a and 12b while each gas-depositing side preferably defines the plurality of through slits 50. In other embodiments, a screen may be utilized in place of or in addition to the slits. To facilitate a flow of the flushing gas 25 into the duct 10, the inlet 40, depositing member's hollow chamber 65, through slits 50 of respective depositing sides 20a and 20b and respective interior sections 12a and 12b are in fluid communication with one another, with the inlet also in fluid communication with the flushing gas source (not shown).

Referring again to FIGS. 3 and 4, an outlet (i.e., respective outlets 55a and 55b) is defined in the wall 45 of the duct 10 within each interior section 12a and 12b. The at least one gas-receiving member 35 defines a pair of inwardly directed gas-receiving louvers 60a and 60b, with each louver respectively directed into each interior section 12a and 12b. In other embodiments, a screen may be utilized in place of or in addition to the louvers. Hollow receiving chambers 62a and 62b are preferably defined within the at least one receiving member 35 between the respective outlets 55a and 55b and louvers 60a and 60b. To facilitate a flow of at least the residual gases 30 from the duct 10, the outlets 55a and 55b, receiving chambers 62a and 62b, receiving louvers 60a and 60b and interior sections 12a and 12b are in respective fluid communication with one another.

Figure 4A:
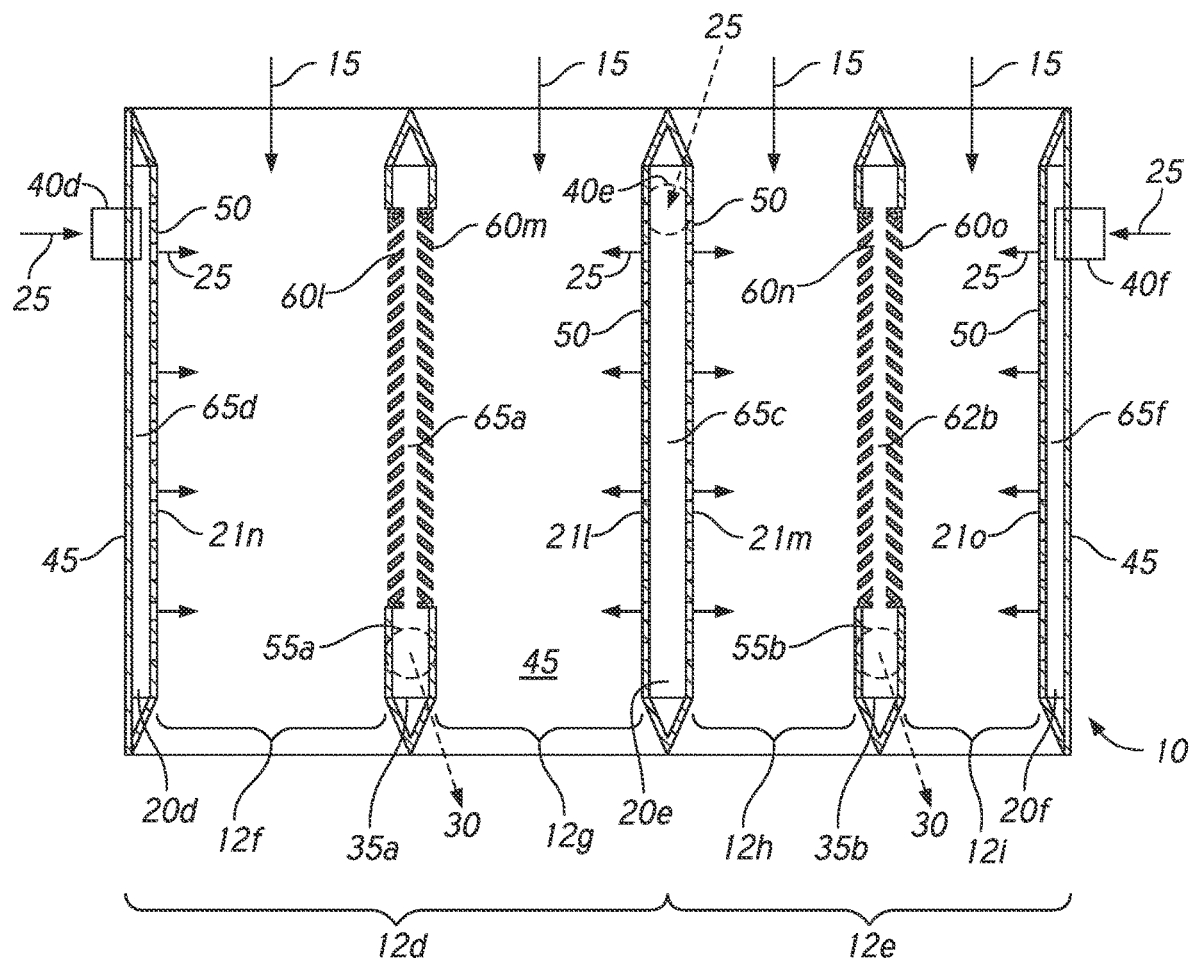
FIG. 4a is a sectional view of a third embodiment of the chute of the invention illustrated in FIG. 1

In a third embodiment of the invention illustrated in FIG. 4a, the inlets 40d, 40e and 40f are defined in wall 45 of the duct 10 for three respective gas-depositing members 20d, 20e and 20f. Although duct 10 is round, it is understood that duct may be square, rectangular or any other shape as well. Gas-depositing members 20d and 20f are respectively defined in wall 45 while gas-depositing member 20e divides the duct's interior 12 into two interior sections, 12d and 12e. Respective outlets 55a and 55b are defined in the wall 45 of the duct 10 for two respective gas-receiving members 35a and 35b. Gas-receiving members 35a and 35b each respectively divide interior sections 12d and 12e into respective subsections 12f and 12g, and 12h and 12i.

Gas-depositing members 20d, 20e and 20f define respective hollow depositing chambers 65d, 65e and 65f while gas-receiving member defines respective hollow receiving chambers 62a and 62b. Gas-depositing member 20e further defines a pair of outwardly directed gas-depositing sides 21l and 21m while members 20d and 20f define inwardly directed sides 21n and 21o, respectively. Sides 21l through 21o each preferably defines the plurality of through slits 50. In other embodiments, a screen may be utilized in place of or in addition to the slits. Gas-receiving members 35a and 35b each respectively define a pair of outwardly directed gas-receiving louvers 60l and 60m, and 60n and 60o. In other embodiments, a screen may be utilized in place of or in addition to the louvers.

To facilitate a flow of the flushing gas 25 into the duct 10, the inlets 40d, 40e, and 40f, depositing member's hollow chambers 65d, 65e and 65f, and through slits 50 of respective depositing sides 21n through 21o and respective interior sub-sections 12f though 12i are in fluid communication with one another, with the inlets also in fluid communication with the flushing gas source (not shown). To facilitate a flow of at least the residual gases 30 from the duct 10, the outlets 55a and 55b, receiving chambers 62a and 62b, receiving louvers 60l through 60o and respective interior sections 12f through 12i are in respective fluid communication with one another.

Figure 5:
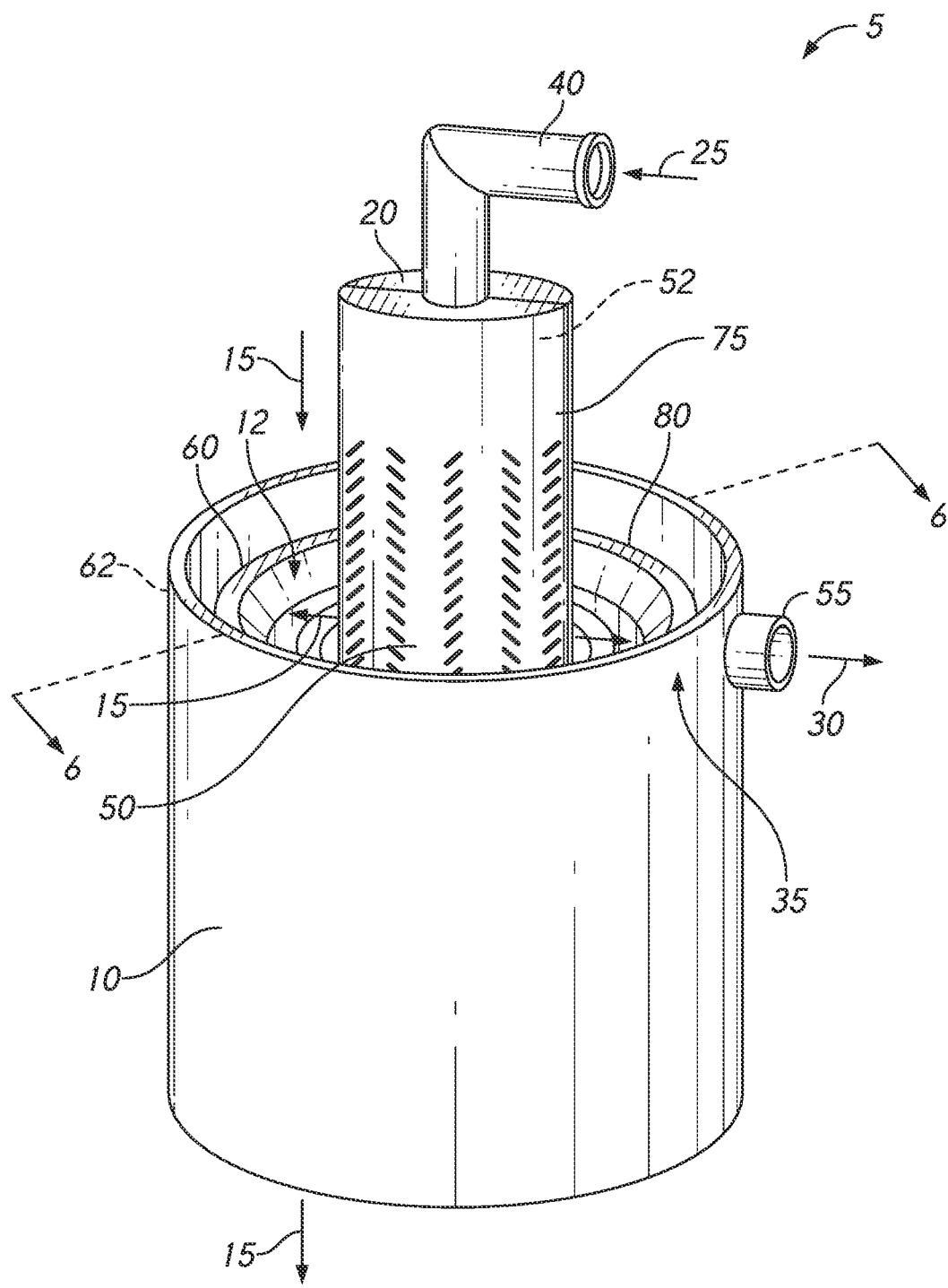
FIG. 5 is a perspective view of a fourth embodiment of the chute of the invention illustrated in FIG. 1.
Figure 6:
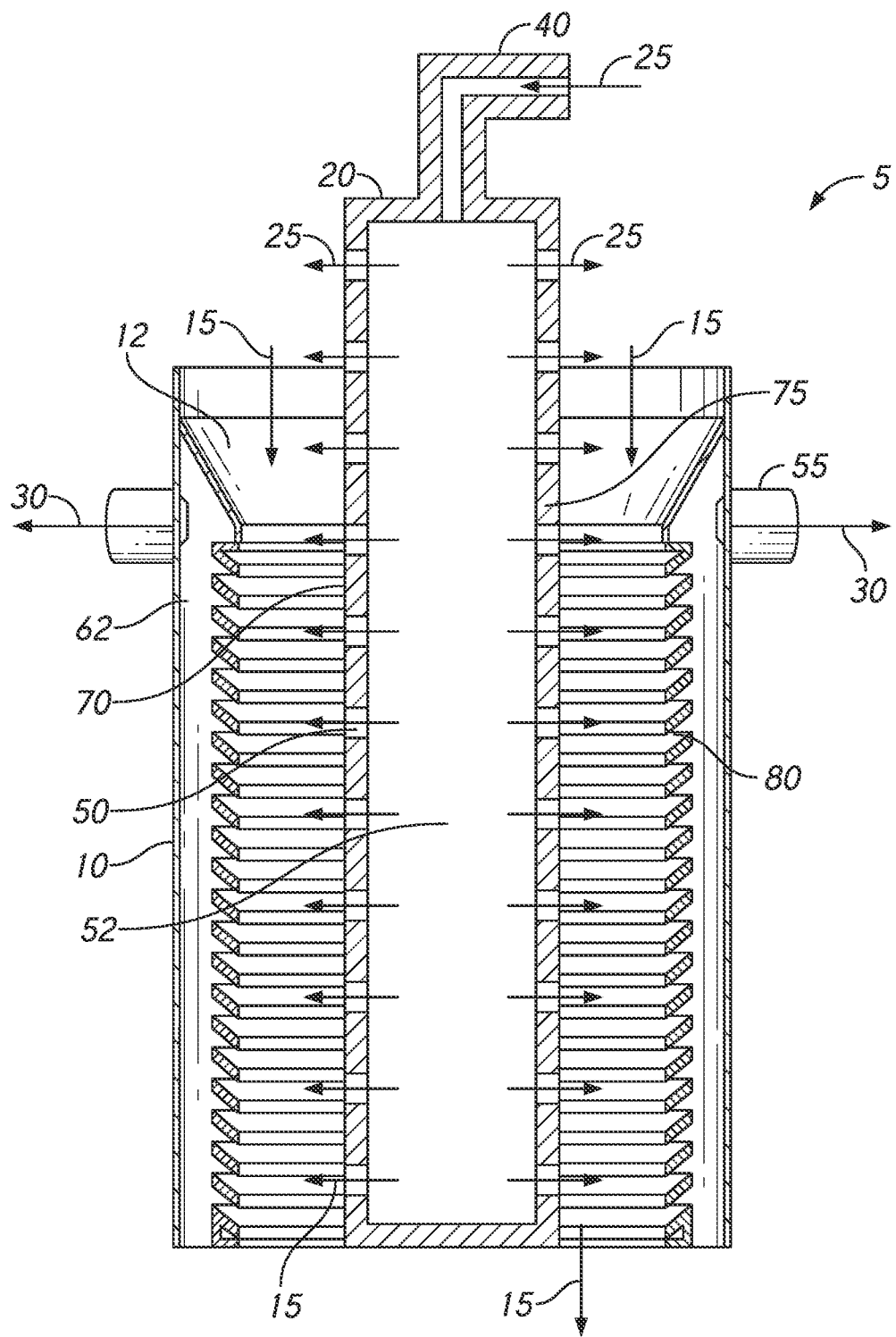
FIG. 6 is a sectional view of the chute illustrated in FIG. 5.

In a fourth embodiment of the invention illustrated in FIGS. 5 and 6, the at least one gas-depositing member 20 is preferably coaxial with the duct 10 and the inlet 40 defines a gas-depositing outer periphery 75. Although duct 10 and gas-depositing member 20 are round, it is understood that duct and/or member may be square, rectangular or any other shape as well. The outer periphery 75 preferably defines a plurality of through slits 50 directed into the duct's interior 12. In other embodiments, a screen may be utilized in place of or in addition to the slits. A hollow depositing chamber 52 is preferably defined within the depositing member 20 between the inlet 40 and the through slits 50 of the outer periphery 75. To facilitate a flow of the flushing gas 25 into the duct 10, the interior 12, through slits 50, depositing chamber 52 and inlet 40 are in fluid communication with one another, with the inlet also in fluid communication with the flushing gas source (not shown).

Referring again to FIGS. 5 and 6, an outlet 55 and the at least one gas-receiving member 35 are also defined in the wall 45 of the duct 10, with the least one gas-receiving member 35 defining a gas-receiving inner periphery 80 of the duct 10 directed into the duct's interior 12. The inner periphery 80 preferably defines a peripheral gas-receiving louver 60 directed into the duct's interior 12. In other embodiments, a screen may be utilized in place of or in addition to the louver. A hollow receiving chamber 62 is preferably defined within the at least one receiving member 35 between the outlet 55 and the peripheral louver 60. To facilitate a flow of at least the residual gases 30 from the duct 10, the interior 12, peripheral receiving louver 50, receiving chamber 62 and outlet 55 are in fluid communication with one another.

In use in its most basic form (FIG. 1), a chute 5 is provided for flushing a residual gas from a granular product 15. The granular product. 15 flows into the interior 12 of the duct 10, typically under the influence of gravity and entrained with undesirable, residual gases 30. While the product 15 flows through the duct 10, flushing gas 25 also flows into the interior 12 of the duct 10 from the at least one gas-depositing member 20. The flushing gas 25 mixes with the product 15 and displaces the residual gases 30 therefrom, with the receiving member 35 receiving at least the residual gases displaced from the product. The granular product 15 thereafter flows out of the interior 12 of the duct 10, again typically under the influence of gravity, but now preferably entrained primarily with the desirable and freshness-preserving flushing gas 25.

In use in the first embodiment (FIGS. 2A and 2B), a chute 5 is again provided for flushing a residual gas from a granular product 15. The granular product 15 again flows into the interior 12 of the duct 10, typically under the influence of gravity and entrained with undesirable, residual gases 30. While the product 15 flows through the duct 10, flushing gas 25 also flows into the interior 12 of the duct 10 from the slits 50 of the at least one gas-depositing member 20. The flushing gas 25 mixes with the product 15 and displaces the residual gases 30 therefrom, with the louvers 50 of the at least one receiving be r 35 receiving least the residual gases displaced from the product. The granular product 15 thereafter flows out of the interior 12 of the duct 10, again typically under the influence of gravity, but now preferably entrained primarily with the desirable and freshness-preserving flushing gas 25.

In use in the second embodiment (FIGS. 3 and 4), a chute 5 is again provided for flushing a residual gas from a granular product 15. The granular product 15 flows into the interior sections 12a and 12b of the duct 10, typically under the influence of gravity and entrained with undesirable, residual gases 30. While the product 15 flows through the duct 10, flushing gas 25 also flows into the interior sections 12a and 12b of the duct 10 from the slits 50 of the at least one gas-depositing member sides 20a and 20b. The flushing gas 25 mixes with the product 15 and displaces the residual gases 30 therefrom, with the respective louvers 50a and 50b of the at least one receiving member 35 receiving at least the residual gases displaced from the product. The granular product 15 thereafter flows out of the interior sections 12a and 12b of the duct 10, again typically under the influence of gravity, but now preferably entrained primarily with the desirable and freshness-preserving flushing gas 25.

In use in the third embodiment (FIG. 4a), a chute 5 is again provided for flushing a residual gas from a granular product 15. The granular product 15 flows into the interior sections 12f through 12i of the duct 10, typically under the influence of gravity and entrained with undesirable, residual gases 30, While the product 15 flows through the duct 10, flushing gas 25 also flows into the interior sections 12f through 12i of the duct 10 from the slits 50 of the at least one gas-depositing member sides 21l through 21o. The flushing gas 25 mixes with the product 15 and displaces the residual gases 30 there-from, with the respective louvers 60l through 60o of the respective receiving members 35a and 36b receiving at least the residual gases displaced from the product. The granular product 15 thereafter flows out of the interior sections 12f through 12i of the duct 10, again typically under the influence of gravity, but now preferably entrained primarily with the desirable and freshness-preserving flushing gas 25.

In use in the fourth embodiment (FIGS. 5 and 6), a chute 5 is again provided for flushing a residual gas from a granular product 15. The granular product 15 flows into the interior section 12 of the duct 10, typically under the influence of gravity and entrained with undesirable, residual gases 30. While the product 15 flows through the duct 10, flushing gas 25 also flows into the interior 12 of the duct 10 from the gas slits 50 of the at least one gas-depositing member outer periphery 75. The flushing 25 mixes with the product 15 and displaces the residual gases 30 therefrom, with the peripheral louver 50 of the inner periphery 80 at least one receiving member 35 receiving at least the residual gases displaced from the product. The granular product 15 thereafter flows out of the interior section 12 of the duct 10, again typically under the influence of gravity, but now preferably entrained primarily with the desirable and freshness-preserving flushing gas 25.

While this foregoing description and accompanying figures are illustrative of the present invention, other variations in structure and method are possible without departing from the invention's spirit and scope.

I claim:

1. A chute for flushing a residual gas from a granular product comprising:
   an upright open-ended duct defining a through interior for receiving a flow of granular product there-though;
   at least one gas-depositing member operably associated with the duct for depositing a flushing gas into the flow of granular product and flushing the residual gas therefrom; and
   at least one gas-receiving member operably associated with the duct for receiving at least the residual gases displaced from the flow of granular product.

2. The chute of claim 1 wherein:
   an inlet and the at least one gas-depositing member are defined in a wall of the duct, the at least one gas-depositing member defining a plurality of through slits directed into the duct's interior, the interior, through slits and inlet in fluid communication with one another; and
   an outlet and the at least one gas-receiving member are defined in the wall of the duct, the at least one gas-receiving member defining a gas-receiving louver directed into the duct's interior, the interior, gas-receiving louver and outlet in fluid communication with one another.

3. The chute of claim 1 wherein:
   an inlet is defined in a wall of the duct and the at least one gas-depositing member bifurcates the duct's interior into two interior sections, the at least one gas-depositing member defining a hollow depositing chamber and a pair of outwardly directed gas-depositing sides defining a plurality of through slits respectively directed into each interior section, the inlet, depositing chamber, through slits and respective interior sections in fluid communication with one another; and
   a pair of outlets and the at least one gas-receiving member are defined in the wall of the duct, the at least one gas-receiving member defining a pair of inwardly directed gas-receiving louvers respectively directed into each interior section, the outlets, gas-receiving louvers and interior sections in respective fluid communication with one another.

4. The chute of claim 1 wherein:
   the at least one gas-depositing member is coaxial with the duct and defines an inlet defining a gas-depositing outer periphery, the outer periphery defining a plurality of through slits directed into the duct's interior, the interior, through slits, and inlets in fluid communication with one another; and
   an outlet is defined in the wall of the duct, the at least one gas receiving member defining a gas-receiving inner periphery of the duct, the inner periphery defining a gas-receiving louver directed into the duct's interior, the outlet, gas-receiving louver and interior in fluid communication with one another.

5. The chute of claim 1 wherein:
   an inlet and the at least one gas-depositing member are defined in a wall of the duct, the at least one gas-depositing member defining a gas-depositing screen directed into the duct's interior, the interior, gas-depositing screen and inlet in fluid communication with one another; and
   an outlet and the at least one gas-receiving member are defined in the wall of the duct, the at least one gas-receiving member defining a gas-receiving screen directed into the duct's interior, the interior, gas-receiving screen and outlet in fluid communication with one another.

6. The chute of claim 1 wherein:
   an inlet is defined in a wall of the duct and the at least one gas-depositing member bifurcates the duct's interior into two interior sections, the at least one gas-depositing member defining a hollow depositing chamber and a pair of outwardly directed gas-depositing screens respectively directed into each interior section, the inlet, depositing chamber, gas-depositing screens and respective interior sections in fluid communication with one another; and
   an outlet and the at least one gas-receiving member are defined in the wall of the duct, the at least one gas-receiving member defining a pair of inwardly directed gas-receiving screens respectively directed into each interior section, the outlets, gas-receiving screens and interior sections in respective fluid communication with one another.

7. The chute of claim 1 wherein:
   the at least one gas-depositing member is coaxial with the duct and defines an inlet and a gas-depositing outer periphery, the outer periphery defining a gas-depositing screen directed into the duct's interior, the interior, gas-depositing screen and inlet in fluid communication with one another; and
   an outlet is defined in the wall of the duct, the at least one gas-receiving member defining a gas-receiving inner periphery of the duct defining a gas-receiving screen directed into the duct's interior, the outlet, gas-receiving screen and interior in fluid communication with one another.

8. A method of flushing a residual gas from a flow of product, the method comprising:
   providing a duct, a flushing gas and the flow of product;
   moving the flushing gas through a gas-depositing member operably associated with the duct and into an interior of the duct, the product flowing through the interior of duct;
   moving the flushing gas into the flow of product from the gas-depositing member, the flushing gas displacing the residual gas from the flow of product; and
   moving at least the residual gas to a gas-receiving member operably associated with the duct from the flow of product and out of the interior of the duct.

9. The method of claim 8 further comprising:
   moving the flushing gas through an inlet defined in a wall of the duct and through a plurality of through slits defined in the gas-depositing member, the gas-depositing member defined in the wall of the duct and the through slits directed into the duct's interior; and
   moving at least the residual gas through a gas-receiving louver defined in the gas-receiving member and through an outlet defined in the wall of the duct, the gas-receiving member defined in the wall of the duct and the gas-receiving louver directed into the duct's interior.

10. The method of claim 8 further comprising:
moving the flushing gas through an inlet defined in a wall of the duct, into a chamber both defined by the gas-depositing member and bifurcating the duct into two interior sections, and through a plurality of through slits respectively directed into each interior section; and
moving at least the residual gas through a pair of gas-receiving louvers defined by the gas-receiving member and through a respective pair of outlets defined in the wall of the duct, the gas-receiving member defined in the wall of the duct and the gas-receiving louvers respectively directed into each interior section.

11. The method of claim 10 wherein the flushing gas is carbon dioxide or nitrogen.

12. The method of claim 10 wherein the flushing gas and product is provided at a ratio of about six standard cubic feet per minute of flushing gas to about one hundred pounds-mass of product.

13. The method of claim 8 further comprising:
moving the flushing gas through an inlet defined by the gas-depositing member and through a plurality of slits defined in an outer periphery of the gas-depositing member, the gas-depositing member coaxial with the duct and the through slits directed into the duct's interior; and
moving at least the residual gas through a gas-receiving louver defined in an inner periphery of the gas-receiving member and through an outlet defined in the wall of the duct, the gas-receiving member defined in the wall of the duct and the gas-receiving louver directed into the duct's interior.

14. The method of claim 8 further comprising:
moving the flushing gas through an inlet defined in a wall of the duct and through a gas-depositing screen defined in the gas-depositing member, the gas-depositing member defined in the wall of the duct and the gas-depositing screen directed into the duct's interior; and
moving at least the residual gas through a gas-receiving screen defined in the gas-receiving member and through an outlet defined in the wall of the duct, the gas-receiving member defined in the wall of the duct and the gas-receiving screen directed into the duct's interior.

15. The method of claim 8 further comprising:
moving the flushing gas through an inlet defined in a wall of the duct, into a chamber both defined by the gas-depositing member and bifurcating the duct into two interior sections, and through a pair of gas-depositing screens respectively directed into each interior section; and
moving at least the residual gas through a pair of gas-receiving screens defined by the gas-receiving member and through a respective pair of outlets defined in the wall of the duct, the gas-receiving member defined in the wall of the duct and the gas-receiving screens respectively directed into each interior section.

16. The method of claim 15 wherein the flushing gas is carbon dioxide or nitrogen.

17. The method of claim 15 wherein the flushing gas and product is provided at a ratio of about six standard cubic feet per minute of flushing gas to about one hundred pounds-mass of product.

18. The method of claim 8 further comprising:
moving the flushing gas through an inlet defined by the gas-depositing member and through a gas-depositing screen defined in an outer periphery of the gas-depositing member, the gas-depositing member coaxial with the duct and the gas-depositing screen directed into the duct's interior; and
moving at least the residual gas through a gas-receiving screen defined in an inner periphery of the gas-receiving member and through an outlet defined in the wall of the duct, the gas-receiving member defined in the wall of the duct and the gas-receiving screen directed into the duct's interior.

* * * * *